Oct. 17, 1939.　　　P. N. MILLER　　　2,176,143
MOTOR VEHICLE
Filed April 21, 1937
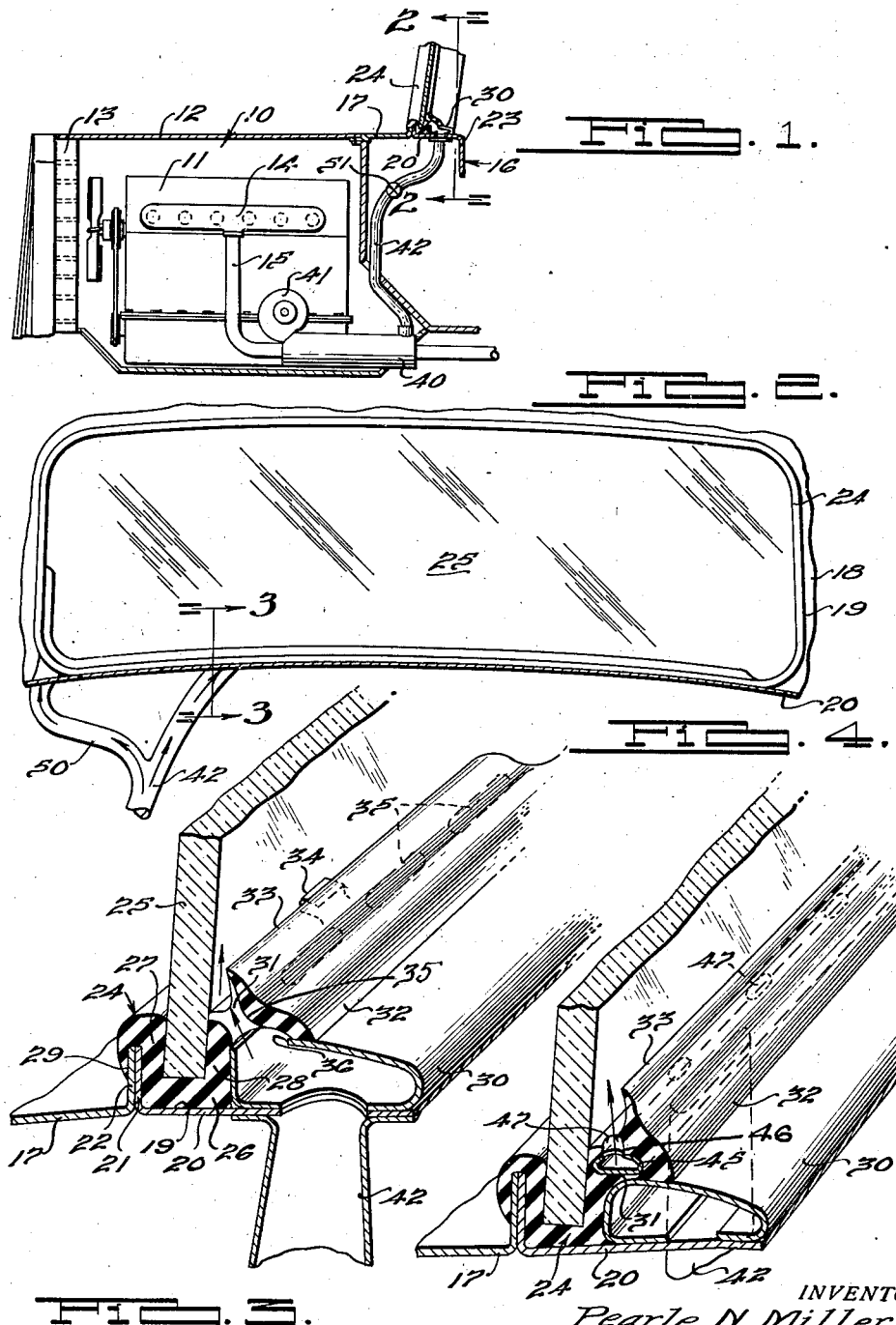
INVENTOR
Pearle N. Miller.
BY
Sibbetts & Hart
ATTORNEYS.

Patented Oct. 17, 1939

2,176,143

UNITED STATES PATENT OFFICE 2,176,143

MOTOR VEHICLE

Pearle N. Miller, Detroit, Mich., assignor to Packard Motor Car Company, Detroit, Mich., a corporation of Michigan Application April 21, 1937, Serial No. 138,198

6 Claims. (Cl. 20—40.5)

This invention relates to vehicles and more particularly to means for heating windshields.

An object of the invention is to reduce the cost and conceal the distributing portion of a windshield heating system by utilizing the windshield structure as a heat distributing means.

Another object of the invention is to provide a windshield gasket that can be utilized as the distributing outlet of a windshield heating system.

A further object of the invention is to provide a windshield gasket and garnish moulding that can be associated to provide the outlet manifold for a windshield heating system.

Another object of the invention is to provide a windshield gasket with conduit means for distributing heated air along a face of the associated windshield glass.

Other objects of the invention will appear from the following description taken in connection with the drawing, which forms a part of this specification, and in which:

Fig. 1 is an elevational view of the front portion of a motor vehicle, partly broken away to show the invention associated therewith;

Fig. 2 is a sectional view taken on line 2—2 of Fig. 1 showing the distributing portion of the heating system;

Fig. 3 is a sectional view taken on line 3—3 of Fig. 2;

Fig. 4 is a view similar to Fig. 3 but showing a modified form of the invention.

Referring to the drawing by characters of reference, 10 indicates generally a sedan type of motor vehicle having an engine 11, engine hood 12 and radiator 13 arranged and mounted in a conventional manner. Associated with the engine is the usual exhaust gas manifold 14 having an outlet conduit 15 extending therefrom.

The front end of the body assembly is indicated generally by the numeral 16 and consists of a cowl panel 17 and a vertically extending frame member 18 having a windshield opening 19 formed therein. The base portion 20 of this frame member terminates at its forward end in an upstanding flange 21 which is welded to a similar flange 22 formed at the rear end of the cowl panel. The base portion 20 extends rearwardly to form the instrument panel 23.

Sealing means, indicated generally at 24, in the form of a gasket is arranged in the windshield opening for engaging the edge portion of the windshield glass 25. This gasket is preferably formed of moulded rubber and comprises a body having a base 26 and parallel walls 27, 28 extending from the base. Such gasket structure provides a recess into which the edge portion of the windshield glass engages and is sealed. The front wall 27 of the lower length of gasket is formed with a recess 29 for receiving the welded together flanges 21 and 22, so that the joint is sealed and the gasket anchored to the body. The gasket can be otherwise secured to the front assembly in the usual manner. Associated with the gasket is a finish or garnish moulding 30 preferably formed of sheet metal and fastened to the frame member 18 in any conventional manner, such as by screws or welding.

In order to prevent the accumulation of snow and the formation of ice on the windshield glass various types of air heaters and air distributing systems have been employed. Some of these systems utilize heat from the exhaust gas in the outlet conduit and provide distributing systems that are auxiliary to the windshield structure. It is the purpose of the present invention to reduce the cost and improve the appearance of vehicles having windshield heating systems by utilizing part of the windshield structure as the heated air distributing means.

As a means of accomplishing the invention I propose to form the windshield gasket so that it serves the purpose of distributing heated air to the windshield glass, and the manifold or feeding conduit can be formed by the garnish molding adjacent the gasket or can be arranged within the gasket. In either event the wall 28 of the gasket is formed with an extension comprising a neck portion 31 and a head 32. The neck extends preferably at an angle rearwardly from the upper end of wall 28 sufficiently to space the forward lip 33 thereof rearwardly from the windshield glass. To insure this spaced relation of the lip from the glass, spacers 34 as shown in Fig. 3 can be formed on the gasket to project forwardly from the extension. The neck 31 is provided with a series of passages 35 extending therethrough which form the distributing means or outlets for heated air. The angle of the passages is such as to direct the air passing therethrough upwardly toward the rear face of the windshield above the wall 28 of the gasket. The lip overhangs the neck to some extent and assists in directing the heated air upwardly along the glass.

In the preferred form of the invention the hollow moulding is formed with a slot 36 enclosed by the gasket extension and in communication with the passages 35. The moulding and passages 35 will thus form a manifold for distributing heated air along the windshield glass.

The interior of the moulding is connected by suitable means with an air heating system. Around the exhaust conduit 15 is a housing 40 having an inlet portion 41 housing a fan (not shown). A conduit 42 is connected with the outlet end of the housing 40 and is fixed to the underside of the base 20, the base and the garnish moulding having openings through which heated air passes into the moulding from such conduit.

In the form of the invention shown in Fig. 4, the hot air distributing manifold is entirely within the gasket. A tube 45 is moulded in the neck portion of the gasket and is formed with a series of outlet openings 46 along its upper face. These passages 46 communicate with outlet passages 47 formed in the gasket neck opening toward the windshield glass. The lip 33 of the gasket head in this instance overlies the passages 47 to assist in directing heated air upwardly along the glass. Provision is made in forming the gasket for connecting the conduit 42 with the tube 45.

It is to be understood that the heated air distributing system described is not limited in its application to the lower length of gasket and moulding but can be used around the windshield as may be desired. As shown in Fig. 2, a portion of the gasket and moulding along the left side of the windshield is similar to those at the lower portion of the windshield and a branch conduit 50 extends to the manifold at such side. In the main feeding conduit 42 is a valve 51 that can be operated manually to make the system effective or ineffective.

Air is drawn into the inlet 41 and moved through housing 40 where it is heated by the exhaust outlet conduit 15. The heated air is forced from the housing through conduit 42, or 42 and 50 to the manifold, either in the moulding or the gasket and through the passages 35 or 47 to the windshield glass.

By utilizing the windshield structural parts as the manifold or distributing means cost can be reduced because separate apparatus for this purpose is of course eliminated. As the manifold means, herein described, is entirely concealed no vision obscuring space is required for assembly of the device.

Although the invention has been described in connection with a specific embodiment, the principles involved are susceptible of numerous other applications which will readily occur to persons skilled in the art.

What I claim is:

1. A window glass gasket comprising a moulded body formed with a glass receiving recess, said body having a base portion and substantially parallel wall portions extending from the base forming a portion of the recess, a deflector lip formed along one edge of a body wall, and air passage means extending through the base of the lip.

2. In a motor vehicle, a rubber gasket comprising a body having a surface for engaging the edge portion of the windshield glass, a deflector lip formed on the body, and means formed on the gasket for spacing the lip from the glass, said gasket having heated air conducting passages therein opening between the detector lip and the glass engaging surface.

3. A window glass gasket comprising a body having a surface for engaging a face of a glass, a deflector lip beyond and spaced from the surface, and air passages having outlet openings between the deflector lip and the surface.

4. A window pane securing and defrosting means comprising a pane of glass, a gasket engaging the edge portion of the glass pane and having air passages therein with the outer ends adjacent one side of the pane, hollow moulding means securing the gasket in position, the interior of the moulding means being in communication with the inlet ends of the gasket air passages, and a heated air system connected with the interior of the moulding.

5. In a motor vehicle having a windshield glass, the combination of a rubber gasket engaging the edge portion of the glass, said gasket having a plurality of passages therein opening toward the face of the glass, a tube embedded in the gasket, said tube having openings therein registering with the passages in said gasket, and a heated air conduit communicating with the interior of said tube.

6. A window glass securing and defrosting means comprising a rubber gasket directly encasing the edge portion of the glass, said gasket having a plurality of openings therein arranged to direct air against one face of the glass beyond the encased edge portion, anchor means for the gasket, and a heated air system communicating with the openings in said gasket.

PEARLE N. MILLER.